United States Patent Office 3,377,350
Patented Apr. 9, 1968

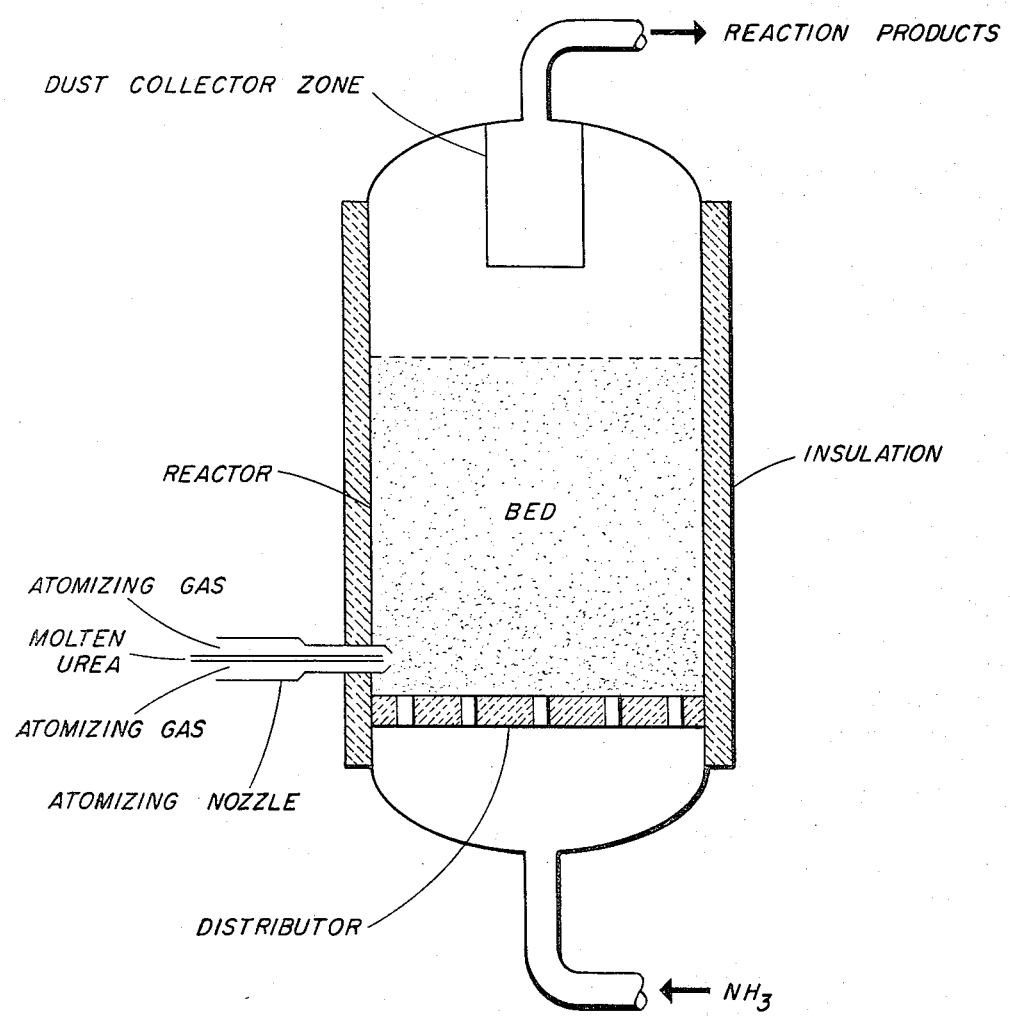

3,377,350
MELAMINE PRODUCTION
Eugene Kerr Watson, Font Hill, Ontario, Canada, and John Maurice Witheford, Tokyo, Japan, assignors to American Cyanamid Company, Stamford, Conn., a corporation of Maine
Continuation-in-part of application Ser. No. 390,527, Aug. 19, 1964. This application Mar. 24, 1967, Ser. No. 625,707
12 Claims. (Cl. 260—249.7)

ABSTRACT OF THE DISCLOSURE

Process for preparing melamine from urea in which molten urea is entrained in an atomizing gas moving at least sonic velocity, the resulting mixture being sprayed into a bed of catalytic solids for conversion to melamine.

This application is a continuation-in-part of application Ser. No. 390,527 filed Aug. 19, 1964, now abandoned.

The present invention relates to an improvement in the preparation of melamine from urea.

Previously, attempts have been made to feed liquid urea to a fluid bed through a dropping tube or through a nonpneumatic nozzle. Neither method permits continuous operation, however, because of agglomeration of bed particles. Alternatively, solid urea, which is more expensive to make, has been fed into a moving bed as a powder and entrained in a gas or blown in with a gas. Agglomeration of the bed particulates was again the problem.

The foregoing and other deficiencies are overcome by the present invention which relates to the production of melamine by contacting urea with catalytically active solids at a temperature in the range of 300° C. to 500° C., preferably 350° C. to 450° C. Still more particularly, the present invention involves atomizing or spraying molten urea, using an atomizing gas such as ammonia, into a bed of these solids. The velocity of the atomizing gas is at least about sonic velocity. The molten urea spray simultaneously entrains particles of the bed to mix with and absorb the urea. Furthermore, the atomizing gas absorbs heat conducted to the spray means, such as a nozzle, thereby preventing decomposition of urea to solid products within the nozzle.

Pursuant to the present invention, also, an ammonia-containing sweeping gas, preferably preheated ammonia or a ammonia-carbon dioxide mixture (e.g., in ratio by volume of about 2:1 to 50:1), is passed upwardly through the bed. If preheated it provides heat to the bed and at the same time sweeps gaseous product melamine formed, as well as effluent gases, from the bed. Generally, the ammonia when preheated is at a temperature of at least about 150° C., preferably above about 300° C. According to still another embodiment, the ammonia supplies a substantial fraction of the heat of reaction by being introduced into the reaction zone at a temperature in the range of 550° C. and 750° C.

As will be seen hereinafter, the bed may be heated by other means exclusively, e.g., heat exchanger tubing in the bed, heating blankets about the reactor, etc. Alternatively, as just suggested, substantially all the heat to the reaction zone may be supplied by superheated ammonia sweeping gas. Obviously, the molten urea supplies some of the heat. Excellent results are achieved by combining the preheated ammonia feature with other heating means, such as a heat exchanger in the bed, to provide a temperature in the range of 300° C. to 500° C. in the reaction zone.

The figure in the attached drawing is a cross sectional view, partly schematic, of a reactor useful for the present invention. It should be noted, however, that this is merely a preferred embodiment. As shown in the drawing, the reactor is cylindrical, vertically-disposed and is rounded at the top and bottom. If desired, it may be insulated as shown. Through the bottom of the reactor is an opening for feeding ammonia gas. At the top of the reactor, as shown, reaction products consisting mostly of melamine are removed from the reactor as shown, preferably through a dust collector or filter, also shown. At a predetermined distance above the bottom of the reactor and inside same is a distributor plate which functions as a manifold. Above the distributor plate, and preferably in the lower portion of the bed as shown, is a nozzle for jetting molten urea into the bed.

The nozzle depicted in the drawing shows an inner molten urea feed tube concentric to a larger tube, thus providing an annular space for an atomizing gas, such as ammonia. The atomizing gas and liquid molten urea blend just before being jetted through the nozzle orifice, the molten urea being entrained in the atomizing gas moving at at least sonic velocity.

Internal mixing of the urea and atomizing gas is achieved by the nozzle arrangement just described. That is, the mixing primarily occurs within the nozzle and before being jetted into the reactor. External mixing, that is, entrainment of urea in the atomizing gas at a point primarily at the nozzle orifice or exterior of the nozzle orifice, may be achieved by arranging the inner molten urea feed tube such that its opening terminates substantially in the same plane as the opening (orifice) of the larger, outer tube.

Arrangements of the nozzle to provide external mixing has several advantages over the arrangement for internal mixing. For example, it has been observed that external mixing requires less atomizing gas, produces less catalyst attrition, and produces less back pressure on the urea feed. External mixing is therefore the preferred practice.

While ammonia is the preferred atomizing gas, carbon dioxide, nitrogen, or the like, may be used in lieu thereof. For example, also, a blend of ammonia gas and carbon dioxide could be employed.

The flow rate of atomizing gas supplied to the atomizing nozzle must be equal to or greater than a critical flow rate (which corresponds to sonic velocity in the nozzle) which is computed from the following Formula I:

(I)   $0.748 \times 10^5 \times AP\sqrt{\gamma M/T}$ pounds per hour

In this expression A is the cross-sectional area of the discharge orifice or annulus of the atomizing nozzle, in square feet; P is the absolute pressure in the reactor vessel, in pounds per square inch; $\gamma$ is the ratio of specific heat at constant pressure to the specific heat at constant volume, both of the atomizing gas and dimensionless; M is the molecular weight of the atomizing gas, in pounds per mol; and T is the absolute temperature of the atomizing gas as it enters the atomizing nozzle, in degrees Rankine (° R.). For ammonia atomizing gas, the value of $\gamma$ is 1.3 and the value of M is 17 pounds per mol.

In the formula above for critical flow rate, it should be understood that the cross-sectional area A differs depending on whether the atomizing nozzle is arranged, as described above, for internal mixing or external mixing. In the former case the cross-sectional area is that of the entire discharge orifice of the atomizing nozzle whereas in the latter case the cross-sectional area is that of the annulas or annular space between the outer tube and the inner, molten urea feed tube.

Obviously, many modifications of the exemplary reactor and nozzle described above will occur to one skilled in the art. For instance, multiple nozzles and/or fluidizing gas inlets are contemplated herein. Multiple product conduits, superimposed reaction zones, and the like, are also within the purview of the instant discovery. The atomizing nozzle or nozzles may be vertically disposed or at a different angle to the vertical from that in the attached figure.

The reactor itself may be metallic or non-metallic, such as quarz, silica, silicone carbide, and the like. If desired a metal reactor which has been coated with a non-metallic high temperature-resistant material may be used, e.g., steel lined with refractory brick. Suitable reactor wall surfaces are stainless steel, nickel-bearing alloys (e.g., Inconel), titanium, Hastelloy B, and the like.

The fluid bed in the reactor of the figure may be heated by various means, as suggested hereinabove. Obviously, both the molten urea and the atomizing gas can provide heat to the bed, as well as a preheated ammonia sweeping gas. If desired a heating jacket may be used about the reactor. According to the embodiment, above, wherein a substantial amount of the heat to the fluid bed catalytic particulates is provided by heat transfer tubes placed in the bed, such as a bank of tubes, it has been found, quite surprisingly, that certain stainless steel tubes are superior to nickel-alloy heat transfer tubes. Stainless steel-304, stainless steel-316, and other iron-based alloys, are unexpectedly good. Stainless steel-304 has 8.0%–11.0% nickel, 18.0%–20.0% chromium, the balance iron, and only minor amounts of carbon, manganese and silicon; stainless steel-316 has 10.0%–14.0% nickel, 16.0%–18.0% chromium, 2.0%–3.0% molybdenum, the balance iron, and only minor amounts of carbon, manganese and silicon. While these iron-based alloys containing up to about 20.0% nickel and up to about 18.0% chromium are very effective, other alloys of similar composition are also contemplated herein.

Obviously, a superheated material, such as steam, molten salt, and the like, is coursed through the tubing in a conventional manner to effect heat exchange. The alloy may be electrically heated to achieve the same exchange.

Pursuant to another embodiment of the present invention, any dust or minute particulates entrained by the melamine-containing gaseous reaction products removed from the reactor are filtered, such as by the use of a screen, filter bag, or the like, such as shown in the figure. Typical entrained particles are $SiO_2$ dust particles. Obviously, removal of these impurities can be very conveniently done at this point and precludes the necessity for more cumbersome melamine product purification processes.

The catalytically active solids employed in the reactor bed of the present process are not critical and may be any such materials known in the art of urea to melamine conversion processes. These include inert, inorganic, heat-stable, highly porous, absorbent solids of high surface area such as activated oxide gels of the amphoteric elements. Activated gels of alumina, titania, zirconia, thoria, and the like, are illustrative. There are also many naturally-occurring absorbents available commercially in activated form which are suitable, e.g. pumice, diatomite, infusorial earth, and the like. Others, such as clays and clay-like materials, viz., kaolin, bentonite, bauxite, etc., are activated by an acid wash prior to thermal dehydration, thereby depositing on each particle of material a layer of silica and/or alumina gel.

Particulates having surface areas in the range of 50 square meters per gram to 650 square meters per gram (Brunauer-Emmett-Teller) are suitable. These gels may have up to about 20% absorbed water at start up, i.e., bound or free water, without significantly affecting the reaction contemplated herein. It is generally preferred to remove much of the water, however, prior to starting up, such as by pre-sweeping of the bed with pre-heated sweeping gas. Absent this, however, most of the water, especially free water, is removed in the early part of any run.

Additionally, lower internal surface area catalytic solids may be employed, such as those in the range of about 0.1 to 50 square meters per gram. The literature is extensive on the subject of catalytic solids, whether high or low surface area, as represented by the following:

U.S. 3,265,695—Catalyst formed by heating together a urea material and a phosphorus material.
U.S. 3,210,352—Catalysts of boron phosphate or aluminum phosphate, surface area, e.g., 16 m.$^2$/g., 54 m.$^2$/g.
U.S. 3,163,648—Catalysts of active alumina of surface area at least about 200 m.$^2$/g. containing ions of phosphate, borate, arsenate, or sulfate.
U.S. 3,112,312—Phosphoric acid on quartz as a catalyst for the conversion of cyanic acid vapor to melamine.
U.S. 3,054,796—Catalyst consisting of charcoal having adsorbed thereon a phosphate material, the phosphate material being 0.1 to 50% by weight of the charcoal-vaporized urea.
U.S. 3,290,309—Solid catalysts with surface area in range 10–80 m.$^2$/g. for use with vaporized urea feed.
British 915,234—Catalyst of $Al_2O_3$ coated with phosphate compound.
Canadian 639,770—Certain metal oxides of total specific surface exceeding 0.1 m.$^2$/g. and substantially no internal surface.

The gaseous effluent products resulting from the instant reaction are removed from the bed substantially as formed. Assisting in this removal is the fluidizing gas, preferably ammonia, which provides an agitated or fluidized bed which appears to be simmering or boiling. The fluidizing gas is usually passed through the bed at a velocity in the range of 0.1 to 5 feet per second, depending upon the particle size of the catalyst.

As suggested hereinabove, the bed of absorbent solids is maintained at a temperature in the range of 300° C. to 500° C. in the reaction zone, that is, in the general area about the point where the atomized molten urea enters the bed. The pressure of the reaction zone is not critical and may be "low pressure," in the range of 1 to 10 atmospheres, or "high pressure," in the range of 10 to 200 atmospheres or higher. Preferably, low pressures are employed, and best results are achieved at atmospheric or slightly higher pressures.

While the invention is primarily described herein as relating to single catalytic bed processes, the essence of the invention is the mixing or entrainment of molten urea in an atomizing gas moving at at least sonic velocity. This primary feature, of course, is not critically dependent on the nature of the catalyst, arrangement of catalyst bed, reactor design, or other like factors. Hence, the invention may be practiced in conjunction with variations in design, such as two bed systems of which the following patents are illustrative: U.S. 3,152,128, U.S. 3,095,416, and Canadian 742,220.

The present invention will best be understood from the following examples.

Example 1

A vertical, cylindrical reactor vessel, six inches in internal diameter, and six feet high is constructed of stainless steel. It is fitted with gas inlet means at the bottom and gas outlet means at the top. A gas distributor consisting of a circular stainless steel plate perforated with a multitude of holes is located in a horizontal position just above the gas inlet. A pneumatic atomizing nozzle is mounted horizontally through the reactor wall at a point located six inches above the gas distributor. The cross-sectional area of the nozzle discharge orifice is $1.205 \times 10^{-5}$ square feet. The reactor is fitted with thermocouples which measure internal temperature and a gauge which measures internal pressure. Electrical heating means are attached to the wall of the reactor.

Into this reactor is charged five kilograms of silica gel powder (about 50 microns diameter and 600 square meters per gram surface area). Ammonia gas is heated to a temperature of 200° C. and passed into the reactor inlet at a rate of 17 pounds per hour. The electrical heaters on the reactor wall are adjusted so that the internal thermocouples measure a temperature of 375° C. The absolute pressure in the reactor is 15 pounds per square inch.

The critical flow rate for atomizing ammonia gas is computed from Formula I, above, for T equal to 756° R., which is equivalent to 147° C., and for P equal to 15 pounds per square inch, and for A equal to $1.205 \times 10^{-5}$ square feet. The computed critical flow rate is 2.3 pounds per hour. Ammonia gas is heated to an average temperature of 147° C. and passed through the gas passage of the atomizing nozzle at a rate of 3.0 pounds per hour.

Molten urea at a temperature of 135° C. is passed through the liquid passage of the atomizing nozzle at an average rate of 20 pounds per hour. Gas leaving the outlet of the reactor is passed through an air cooled pipe, wherein melamine condenses, and then to the atmosphere.

Operation of the apparatus is continued in this manner for a period of 4 hours. Then the ammonia and urea flows are stopped, the reactor cooled, and the silica gel powder drained from the reactor. The silica gel thus removed is free-flowing and free of lumps. The reactor is opened and inspected and found to be free of any accumulation of material.

Example 2

The reactor described in Example 1 is charged with 5 kilograms of silica gel powder (50 microns; 600 square meters per gram). Ammonia gas is heated to 200° C. and passed into the reactor inlet at a rate of 9.8 pounds per hour. The internal temperature of the reactor is adjusted to 375° C. by means of electrical heaters on the reactor wall. Ammonia gas is heated and passed through the gas passage of the atomizing nozzle at a rate of 5.0 pounds per hour. Molten urea at a temperature of 135° C. is passed through the liquid passage of the atomizing nozzle at an average rate of 6.0 pounds per hour. Operation is continued in this manner for 24 hours. Periodically, small additions of silica gel powder are charged to the reactor to replace that taken out as samples and that carried out with the gas leaving the reactor.

The temperature of the ammonia supplied to the atomizing nozzle varies between 92° C. and 132° C. The pressure in the reactor varies between 15 pounds per square inch absolute and 17 pounds per square inch absolute. The critical flow rate for atomizing ammonia computed from Formula I, above, for these conditions varies between 2.3 pounds per hour and 2.8 pounds per hour. The actual atomizing flow rate of 5.0 pounds per hour that is used is, therefore, always greater than the critical flow rate.

At the end of 24 hours the ammonia and urea flows are stopped, the reactor is cooled, and the silica gel powder discharged. It is free flowing and without lumps. The reactor is opened and inspected. It is found free of accumulated material, thus indicating that continuous operation for much longer periods is practical.

Example 3

This example shows that the use of an atomizing gas flow rate greater than the critical flow rate computed from Formula I, above, is essential to the continuous successful operation of the process of this invention.

In a manner similar to that in Examples 1 and 2, above, six runs are made in which the cross-sectional area of the atomizing nozzle discharge orifice, the reactor pressure, and the atomizing ammonia flow rate are varied. In all six runs (a, b, c, d, e, and f, infra) the charge of silica gel powder (50 microns; 600 square meters per gram) to the reactor is 5.0 kilograms, the internal reactor temperature is 375° C., the flow rate of ammonia to the reactor inlet varies from 8 pounds per hour to 18 pounds per hour, and the urea flow rate is 6.0 pounds per hour. The temperature of the atomizing ammonia is between 140° C. and 150° C. The temperature of the molten urea feed is about 135° C. The temperature of the ammonia supplied to the reactor inlet is about 200° C. Each run is continued for 4 hours, then stopped and the silica gel powder and the inside of the reactor examined.

Table I, infra, shows the cross sectional area of the nozzle discharge orifice, the reactor pressure, the critical atomizing flow rate computed from Formula I, the actual atomizing ammonia flow rate used, and the result of the examination for each run. In Table I, the word "plug" refers to a solid accumulation of silica gel particles bonded together by organic material, said solid accumulation being adhered to the end of the atomizing nozzle and extending into the reactor. It was clear that continued growth of this accumulation would soon prevent continued operation of the process.

As can be seen by inspection of Table I, the plug formed only in those runs in which the flow rate of atomizing ammonia is less than the critical flow rate computed from Formula I, whereas no plug is formed in those runs in which the flow rate of atomizing ammonia is greater than the critical flow rate computed from Formula I, above.

TABLE I

| Run No. | Cross-Sectional Area of Nozzle Discharge Orifice in sq. ft. | Reactor Pressure (lbs./in.² absolute) | Critical Atomizing Ammonia Flow Rate Computed from Formula (lbs./hr.) | Actual Atomizing Ammonia Flow Rate (lbs./hr.) | Result |
|---|---|---|---|---|---|
| (a) | $1,205 \times 10^{-5}$ | 15 | 2.3 | 1.5 | Plug. |
| (b) | $1,205 \times 10^{-5}$ | 15 | 2.3 | 2.7 | No plug. |
| (c) | $1,205 \times 10^{-5}$ | 30 | 4.6 | 4.5 | Plug. |
| (d) | $1,205 \times 10^{-5}$ | 30 | 4.6 | 5.0 | No plug. |
| (e) | $1,963 \times 10^{-5}$ | 15 | 3.8 | 3.5 | Plug. |
| (f) | $1,963 \times 10^{-5}$ | 15 | 3.8 | 4.0 | No plug |

The following examples demonstrate still other modes of operation within the purview of the present invention:

Silica gel (50 microns; 600 m.²/gm.) is charged to an 18 inch diameter fluidized bed reactor. This reactor is 20 feet long and is equipped with a gas distribution plate at the inlet and four sets of ceramic filters at the outlet. Each set of filters consists of a group of ceramic tubes, each tube being approximately 36 inches long and 3 inches diameter. The reactor is also equipped with a two-fluid atomizing nozzle for the injection of a spray of molten urea into the bed as described in Example 1 and the figure, above, the atomizing fluid being ammonia. The reactor is further equipped with internal heat exchange tubes (Example 4, infra) through which sufficient heat can be supplied to provide the endotherm for the reaction. Alternatively, the heat of reaction can be provided by preheating the stripping ammonia gas (Example 5, infra) to a temperature in the neighborhood of 650° C.

Example 4

Using a silica gel charge of 605 pounds, the reactor just described is maintained at 385° C. using internal heat exchangers (stainless steel-304) and fluidized with an ammonia stream at 390±20° C. During a period of 112 hours, 5189 pounds of urea and 5454 pounds of total ammonia are fed to the reactor. During the same period the measured output of melamine from the reactor is 1773 pounds corresponding to a conversion of urea to melamine of 97%.

Example 5

Using a silica gel charge of 260 pounds, the reactor just described is again maintained at 385° C. However, in this case the fluidizing ammonia is preheated to a temperature in the range 610–625° C. During a period of 63.4 hours, 2700 pounds of urea and 4229 pounds of total ammonia are fed to the reactor and 880 pounds of melamine (93% conversion) is obtained. In a similar experiment, the fluidizing ammonia is maintained at 630° C. During a period of 26.5 hours, 1157 pounds of urea and 1691 pounds of ammonia are fed to the reactor and 396 pounds of melamine (98% conversion) are produced.

These and other similar examples demonstrate that essentially equivalent results are obtained when the reaction endotherm is supplied by heat transfer through internal heat exchangers as when it is supplied by preheating the fluidizing ammonia to a temperature in the range of 550–750° C.

The conditions described in the above examples may be modified substantially and still realize desired yields of melamine. For example, the bed particulates while having a surface area in the range given hereinabove may have diameters in the range of 5 to about 2000 microns, average 30 microns to 1000 microns. By the same token, the ratio of total ammonia to urea in the process contemplated herein may range from 0.2 pound to 1 pound and 10 pounds to 1 pound, preferably in the range of 1 pound to 1 pound and 3 pounds to 1 pound. The ratio of atomizing gas, say ammonia, to urea may range from 0.1 pound to 1 pound up to the atomizing gas representing 90% of the total ammonia fed to the system. The fluid bed height may vary very considerably and excellent results are achieved in bed heights ranging from 1 foot to over 20 feet. Likewise, although the atomizing nozzle of the foregoing examples was arranged for internal mixing of the molten urea and atomizing gas, the nozzle may be arranged for external mixing (as described hereinabove) with substantially equivalent results.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A process for producing melamine which comprises establishing a bed of catalytically active solids and introducing therein molten urea entrained in an atomizing gas moving at at least about sonic velocity while simultaneously passing upwardly through the bed an ammonia-containing sweeping gas, said bed being maintained at a temperature in the range of 300° C. to 500° C., the molten urea being converted, upon contact with said solids, to gaseous melamine which is removed from the bed substantially as formed.

2. The process of claim 1 wherein the molten urea is jetted into the bed of solids by means of an atomizing nozzle.

3. The process of claim 2 wherein said atomizing nozzle comprises a first tube concentrically disposed within a second tube, thus providing an annular space therebetween, the exit end of said second tube terminating in an orifice and the corresponding exit end of said first tube terminating short of this orifice, thus providing a mixing zone for the atomizing gas which passes through said annular space and the molten urea which passes through said first tube, the contents of said mixing zone thereafter being jetted through said orifice into said catalytically active solids.

4. The process of claim 2 wherein said atomizing nozzle comprises a first tube concentrically disposed within a second tube, thus providing an annular space therebetween, the corresponding exit ends of said tubes terminating in substantially the same plane, thus providing a mixing zone, external of the exit ends of said tubes, for the atomizing gas which passes through said annular space and the molten urea which passes through said first tube, as said atomizing gas and said molten urea are jetted into said catalytically active solids.

5. The process of claim 2 wherein said atomizing nozzle is pneumatic.

6. The process of claim 2 wherein the flow rate of the gas supplied to the atomizing nozzle is at least equal to a critical flow rate (which corresponds to sonic velocity in the nozzle) computed from the formula:

(I) $\quad 0.748 \times 10^5 \times AP\sqrt{\gamma M/T}$ pounds per hour wherein A is the cross-sectional area of the discharge orifice or annulus of the atomizing nozzle in square feet, P is the absolute pressure in the reactor vessel in pounds per square inch, $\gamma$ is a ratio of specific heat at constant pressure to the specific heat at constant volume, both of the atomizing gas and dimensionless, M is the molecular weight of the atomizing gas, in pounds per mole, and T is the absolute temperature of the atomizing gas as it enters the atomizing nozzle in degrees Rankine.

7. The process of claim 6 wherein the atomizing gas is ammonia and its $\gamma$ value is 1.3, the value of M being 17 pounds per mole.

8. The process of claim 1 which comprises maintaining the bed temperature by the use of a heated stainless steel-304 heat transfer tube placed in the bed.

9. The process of claim 1 wherein the bed is maintained at a temperature of 350° to 450° C.

10. The process of claim 1 wherein the ammonia sweeping gas is preheated to a temperature of at least about 350° C.

11. The process of claim 1 wherein the gaseous reaction products taken from the bed are filtered to remove entrained dust particles.

12. The process of claim 1 wherein the ammonia sweeping gas is preheated to a temperature in the range of 550° C. to 750° C.

References Cited

UNITED STATES PATENTS

| 2,566,224 | 8/1951 | Mackay | 260—249.7 |
| 2,566,229 | 8/1951 | Mackay | 260—249.7 XR |
| 3,095,416 | 6/1963 | Crowley et al. | 260—249.7 |

JOHN D. RANDOLPH, *Primary Examiner.*

J. M. FORD, *Assistant Examiner.*

Dedication 3,377,350. —*Eugene Kerr Watson*, Font Hill, Ontario, Canada and *John Maurice Witheford*, Tokyo, Japan. MELAMINE PRODUCTION. Patent dated Apr. 9, 1968. Dedication filed Mar. 4, 1983, by the assignee, *American Cyanamid Co.*

Hereby dedicates the remaining term of said patent to the Public.
[*Official Gazette May 31, 1983.*]